United States Patent [19]

Mansson

[11] Patent Number: 4,919,755
[45] Date of Patent: Apr. 24, 1990

[54] PROCESS FOR BLEACHING

[75] Inventor: Inge Mansson, Kungälv, Sweden

[73] Assignee: Eka Nobel AB, Sweden

[21] Appl. No.: 317,473

[22] PCT Filed: Jun. 14, 1988

[86] PCT No.: PCT/SE88/00320
§ 371 Date: Feb. 13, 1989
§ 102(e) Date: Feb. 13, 1989

[87] PCT Pub. No.: WO88/10334
PCT Pub. Date: Dec. 29, 1988

[30] Foreign Application Priority Data

Jun. 24, 1987 [SE] Sweden ............................. 8702616

[51] Int. Cl.$^5$ ............................................. D21C 3/04
[52] U.S. Cl. ........................................ 162/83; 8/110; 252/188.22; 423/515
[58] Field of Search .................. 162/83, 80; 8/110; 252/188.22; 423/515

[56] References Cited

U.S. PATENT DOCUMENTS

| 2,991,152 | 7/1961 | Goerrig et al. | 423/515 |
| 3,167,515 | 1/1965 | Hinckley et al. | 252/188.22 |
| 3,290,161 | 12/1966 | Sheldon et al. | 106/72 |
| 3,795,491 | 3/1974 | Winiarczyk | 423/286 |
| 3,933,676 | 1/1976 | Wade | 162/83 |

FOREIGN PATENT DOCUMENTS

| 0027369 | 4/1981 | European Pat. Off. . |
| 3427297 | 4/1986 | Fed. Rep. of Germany . |
| 208842 | 11/1966 | Sweden . |
| 217333 | 11/1967 | Sweden . |

OTHER PUBLICATIONS

Tappi, vol. 53, No. 12, Dec. 1970, "Two-Stage Bleaching of High-Yield Pulp at Blandin", C. A. Richardson et al.

"Bright News: Lower-Cost Method for TMP and Groundwood Bleaching", R. G. Guess, Pulp & Paper, 53(6), Jun. 1979, pp. 74–77, 81.

Primary Examiner—Peter Chin
Attorney, Agent, or Firm—Burns, Doane, Swecker & Mathis

[57] ABSTRACT

Process for bleaching of materials, at which an aqueous solution of borohydride containing borohydride corresponding to from 15 to 35 percent by weight of sodium borohydride and hydroxylic ions corresponding to not more than 10 percent by weight of NaOH is brought to react with a bisulfite solution, after which the dithionite solution thus obtained is added to the material to be treated. This process gives a simple and economic preparation of dithionite bleaching solution in situ, in connection with the bleaching.

16 Claims, No Drawings

PROCESS FOR BLEACHING

The present invention relates to a process for bleaching of materials such as wood pulps, clay etc. using a dithionite solution. Particularly the invention concerns a process for such bleaching where a borohydride solution of a relatively low alkalinity is reacted with a bisulphite solution, after which the dithionite solution thus obtained is added to the material to be treated.

It is known to use dithionite, usually sodium dithionite, $Na_2S_2O_4$, for treatment of materials such as clay, wood pulps and textiles. When bleaching wood pulps, especially mechanical pulp, dithionite is used when a lower brightness is desired, while hydrogen peroxide bleaching is used when the requirements of brightness are high. Different dithionite systems are known and can be used. Dithionite in powder form, which is dissolved before use, is favourable from an economical point of view for the user. The handling of powder is, however, unfavourable from work environment point of view and in working with this method losses of active substance is also obtained when preparing the bleach solution. An alternative to the handling of powder is to use a dithionite solution supplied ready for use. However, dithionite solution is instable and in order to avoid losses of active substance during storage resource demanding investments are required for installation of cooling systems and protective gas systems. The supply of ready-prepared dithionite solution also implies a short transport distance between producer and user because of the low amount of active substance. U.S. Pat. No. 3,290,161 describes bleaching of clay by adding directly at the bleaching both alkali metal bisulfite in a solid form and alkali metal borohydride in a solid form. The handling and dissolution of two different solid components is, however, time consuming and troublesome and further increases the disadvantages with handling of powder.

Because of the disadvantages shown by the above mentioned forms of dithionite, an "in situ"-preparation of a dithionite solution at the user has gained an increased importance. The systems hereby used are three-component-systems, based on commercial sodium borohydride solutions, which react with sulphur dioxide and sodium hydroxide, see e.g. DE-A No. 3,427,297. Commercial sodium borohydride solutions, e.g. those sold under registered trademarks Borol and Borino, have a relatively low amount of sodium borohydride and a very high alkalinity, and they contain about 12 percent by weight of $NaBH_4$, 40 percent by weight of NaOH and 48 percent by weight of water. Preparation of dithionite solution in connection with use thereof starting from such a borohydride solution is favourable as such with respect to high stability for the borohydride solution used, but because of the use of three components the method gives high investment costs for e.g. storage and dosage equipment. The commercial borohydride solutions show disadvantages in tending to crystallize at temperatures of about $+13°$ C., and therefore heating is often required when handling these solutions. The handling of sulphur dioxide, which normally exists in a liquid form under pressure, also brings disadvantages, from economical point of view as well as from environmental point of view. This has resulted in a limited use of this type of "in situ"-preparation of dithionite solution, and it is only possible for users having access to the equipment and the know-how required for handling of liquid sulphur dioxide and when big annual consumptions exist.

Another type of "in situ"-preparation is known from U.S. Pat. No. 3,167,515, according to which a solid mixture of alkali metal borohydride and alkali metal bisulfite immediately before use is dissolved in water and pH of the solution is regulated to strong alkalinity. However, also here disadvantages concerning the handling of powder exist, which is unfavourable for work environment and which brings losses of active substance at the preparation of the solution. Moreover the relation between bisulfite to borohydride is low, and furthermore nothing is stated concerning the stability of the solution, only the stability of the solid composition is discussed.

Still another type of "in situ"-preparation is known from EP-A No. 27,369, in which a solution-containing sulfite ions and borohydride ions by pH-regulation immediately before use is brought to contain bisulfite ions. However, the content of borohydride is low and the existing amounts of borohydride and bisulfite are far from the stoichiometric relation, for which reason this solution is not very economic.

It has now being found that borohydride solutions with an acceptable stability can be made more concentrated than before and using considerably less amounts of alkali metal hydroxide, see e.g. U.S. Pat. No. 3,795,491. According to the present invention such solutions can be used for the reaction with a bisulfite solution to a dithionite solution. This invention thus presents a two-component-system for bleaching, a system being extremely advantageous from both economical point of view and from environmental and working point of view. The two-component-system according to the invention does not, as earlier systems, require complicated and expensive equipment or additional safety measures and leads to a broadening of the dithionite bleaching in so far as it can be used with in situ prepared dithionite solution also by e.g. smaller paper mills and within application areas where borohydride could not earlier be used for dithionite bleaching without big investments.

The present invention thus concerns a process for bleaching of materials, where an aqueous solution containing borohydride, corresponding to 15–35 percent by weight of sodium borohydride and containing hydroxyl ions corresponding to not more than 10 percent by weight of NaOH, is brought to react with a bisulfite solution, after which the dithionite solution thus obtained is added to the materials to be treated.

The borohydride solution originates, especially for economical reasons, from sodium borohydride, and the amount of borohydride has been indicated above as percent by weight of sodium borohydride. Of course other water soluble borohydrides, as those from the remaining alkali metals, e.g. lithium and potassium, those from alkaline earth metals, such as magnesium and also ammonium borohydride, can be used and the amount of metal borohydride is then adjusted to give the corresponding amount of borohydride as the above mentioned. The alkali amount in the solution has been indicated as the amount of sodium hydroxide, and of course also potassium hydroxide or mixtures of sodium and potassium hydroxides can be used. A corresponding reasoning applies for the bisulfite solution, where thus sodium bisulfite is preferred for economic reasons and for reasons of availability, while other bisulfites with cations according to the above mentioned ones also can be used. The borohydride solution should contain borohydride corresponding to from 15 to 35 percent by weight of sodium borohydride and not more than 10 percent by weight of NaOH, preferably not more than 5 percent by weight. The lower limit for the alkali amount in the solution is preferably not more than 2 percent by weight. It is preferred to use concentrated borohydride solutions and these therefore contain borohydride in a concentration corresponding to 20 to 35 percent by weight of sodium borohydride. Also at these relatively high concentrations the borohydride solutions show an acceptable stability and can be used for in situ preparation of dithionite solutions without risk for detrimental decomposition of active substance at normal transport and storage times. Thus also the transport is facilitated as concentrated solutions instead of very diluted ones are used. The concentrated borohydride solutions used according to the invention are also advantageous in having considerably lower crystallization tendency than the ones commercially used. They do not crystallize until at temperatures of −10° C. or lower and therefore heating can often be spared for them. As an example of a sodium borohydride solution of a preferable stability a composition of 25 percent by weight of NaBH$_4$ and 5 percent by weight of NaOH can be mentioned. This solution corresponds in molar form to NaBH$_4$+0,2 NaOH and such a solution can then be reacted directly with a sodium bisulfite solution to dithionite according to the formula

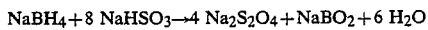
$$NaBH_4 + 8\ NaHSO_3 \rightarrow 4\ Na_2S_2O_4 + NaBO_2 + 6\ H_2O$$

Sodium bisulfite solution is available in many wood and paper industries to a low cost, and in other cases a suitable solution can be prepared from commercially available bisulfite or bisulfite solution. The bisulfite solution is preferably used in a concentration, which is chosen with respect to the concentration of the borohydride solution. In order to obtain as complete reaction of the borohydride as possible and in that way get the best possible economy the molar ratio between bisulfite ions and borohydride ions should be at least stoichiometric, and preferably the molar ratio is within the interval 20:1 to 8:1, more preferred, within the interval 10:1 to 8:1. A small excess of the borohydride component in relation to the overall reaction usually brings no substantial disadvantages to the bleaching process as such. The mixing as such of the two solutions for the reaction to dithionite can be effected in a simple mixing equipment at temperatures of about 30° C. to about 70° C. The pH at the preparation of the dithionite solution should be within the interval of about 4,5 to about 8,5 and a possibly required pH regulation can be made with cheap acids, such as sulfuric acid or with qualified acids, such as phosphoric acid, tartaric acid etc., which also can act as stabilisators in the bleaching solution prepared.

The present process for bleaching is particularly suitable for treatment of wood pulps as here often cheap bisulfite is available, as mentioned above. The word bleaching is here used in a broad sense and concerns the reducing treatment obtained when using a dithionite solution, and the process can of course also be used in such a treatment of other materials, e.g. clay, and in the textile industry when working with vat dyes. As the present process comprises a simplified method for the in situ preparation of dithionite bleaching solutions, which requires no complicated equipment or special safety means, an effective dithionite bleaching is made possible also for users not having been able before to use this method, and this bleaching is also made possible for applications, where it was not possible before to use such a method because of too high investment costs etc.

Bleaching with the in situ prepared dithionite solutions is carried out in a conventional manner. In bleaching of wood pulps the dithionite solution is added to a pulp slurry with a content of dry substance within the interval of about 5 to 15 percent and is left to work at a pH within the interval 4,5 to 7,0 and at a temperature of about 35° to 80° C. during about 10 to 60 minutes. The amount of dithionite used is of course dependent of the original brightness of the pulp and the desired improvement of brightness. Normally amounts corresponding to 0,2 to 1,5 percent by weight of sodium dithionite, calculated on the content of dry substance, is used. When bleaching clay a dithionite solution is usually added to a suspension of clay with a content of dry substance from about 5 to about 15 percent by weight and with a pH within the interval 2,5 to 5. The temperature at bleaching is kept at surrounding temperature, about 20° to 40° C. Also here the amount of dithionite is determined by the desired improvement in brightness, and the amount is usually within the interval 0,2 to 0,7 percent by weight calculated on the clay. In a corresponding way conventional methods are used in the reduction of vat dyes in textile industry.

The accomplishment of the invention also implies a means constituted of a water solution of borohydride, which contains borohydride corresponding to from 15 to 35 percent by weight of sodium borohydride and which contains hydroxylic ions corresponding to not more than 10 percent by weight of NaOH and preferably corresponding to at least 2 percent by weight of NaOH. This means is suited for the preparation of dithionite bleaching solution by reaction with a bisulfite solution, and particularly water solutions of borohydride containing not more than 5 percent by weight NaOH, and most preferably those containing from 20 to 35 percent by weight of sodium borohydride, are preferred. Water solutions of borohydride for use in performing the invention can be prepared from sodium borohydride, preferred for economic reasons, or from another water soluble borohydride, such as the remaining alkali metal borohydrides, e.g. those of lithium and potassium, borohydrides of alkaline earth metals, such as magnesium and ammonium borohydride. The borohydride solutions to be used in performing the invention have a low alkalinity and in spite of this show a good stability at high concentrations, which makes them very suitable for use for in situ preparation of dithionite bleaching liquid by reaction with bisulfite solution.

The invention is further illustrated in the following example of performance, however not intended to limit it. Parts and percentages concern parts by weight and percent by weight, respectively, if nothing else is indicated.

EXAMPLE

A sodium dithionite solution is prepared according to the following: 1 l sodium borohydride solution containing 25% NaHB$_4$ and 5% NaOH was reacted with 56 l sodium bisulfite solution of 12%. The reaction was performed at a temperature of 40° C. and pH was regulated to 6,5. About 57 l of sodium dithionite solution of 10% was obtained.

Mechanical pulp prepared from spruce wood in a Scandinavian paper mill was bleached with a dithionite solution prepared as above. The pulp concentration was 5%, the temperature was 60° C. and pH was 5,5. The bleaching was performed during a time period of 60 minutes. The dithionite solution was added to the pulp in different concentrations of dithionite, and with the solution was added 2,5 kg tripolyphosphate per ton pulp.

After bleaching the pulp was washed and a test sheet was prepared according to the SCAN standard. In the table below the brightness measured at different concentrations are shown and also a comparison to unbleached pulp.

| $Na_2S_2O_4$ kg/t | Brightness % ISO |
|---|---|
| — | 61,6 |
| 6 | 71,1 |
| 8 | 72,1 |
| 10 | 73,2 |

I claim:

1. Process for bleaching of materials with a dithionite solution, characterised in that an aqueous borohydride solution containing borohydride corresponding to from 15 to 35 percent by weight of sodium borohydride and containing hydroxylic ions corresponding to not more than 10 percent by weight of NaOH is brought to react with a bisulfite solution, after which the dithionite solution thus obtained is added to the material to be treated.

2. Process according to claim 1, characterised in that the aqueous borohydride solution contains borohydride corresponding to from 20 to 35 percent by weight of sodium borohydride.

3. Process according to claim 1 or 2, characterised in that the aqueous borohydride solution contains not more than 5 percent by weight of NaOH.

4. Process according to claim 1, characterised in that the borohydride solution is a sodium borohydride solution.

5. Process according to claim 1, characterised in that the bisulfite solution is a sodium bisulfite solution.

6. Process according to claim 1, characterised in that the material to be treated is a pulp slurry.

7. Process according to claim 2, characterised in that the aqueous borohydride solution contains not more than 5 percent by weight of NaOH.

8. Process according to claim 2, characterised in that the borohydride solution is a sodium borohydride solution.

9. Process according to claim 3, characterised in that the borohydride solution is a sodium borohydride solution.

10. Process according to claim 2, characterised in that the bisulfite solution is a sodium bisulfite solution.

11. Process according to claim 3, characterised in that the bisulfite solution is a sodium bisulfite solution.

12. Process according to claim 4, characterised in that the bisulfite solution is a sodium bisulfite solution.

13. Process according to claim 2, characterised in that the material to be treated is a pulp slurry.

14. Process according to claim 3, characterised in that the material to be treated is a pulp slurry.

15. Process according to claim 4, characterised in that the material to be treated is a pulp slurry.

16. Process according to claim 5, characterised in that the material to be treated is a pulp slurry.

* * * * *